United States Patent
Nauerz et al.

(10) Patent No.: US 7,536,637 B1
(45) Date of Patent: May 19, 2009

(54) METHOD AND SYSTEM FOR THE UTILIZATION OF COLLABORATIVE AND SOCIAL TAGGING FOR ADAPTATION IN WEB PORTALS

(75) Inventors: Andreas Nauerz, Böblingen (DE); Stefan Liesche, Böblingen (DE); Stefan Behl, Holzgerlingen (DE); Michael Junginger, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/027,659

(22) Filed: Feb. 7, 2008

(51) Int. Cl.
*G06F 17/21* (2006.01)
*G06F 17/30* (2006.01)
*G06F 15/18* (2006.01)

(52) U.S. Cl. .......... 715/230; 715/234; 715/247; 715/744; 715/853; 706/55; 707/104.1; 704/9

(58) Field of Classification Search ......... 715/215, 715/230, 231, 234, 233, 236, 243, 249, 255, 715/273, 742, 744, 853, 854; 709/201, 203; 705/1; 707/1, 6, 100, 101, 104.1; 706/45, 706/46, 16, 20, 55; 704/9, 10
See application file for complete search history.

(56) References Cited

U.S. PATENT DOCUMENTS

| | | | | |
|---|---|---|---|---|
| 6,327,628 | B1 * | 12/2001 | Anuff et al. | 719/311 |
| 6,636,242 | B2 * | 10/2003 | Bowman-Amuah | 715/764 |
| 6,832,263 | B2 * | 12/2004 | Polizzi et al. | 709/246 |
| 6,968,333 | B2 * | 11/2005 | Abbott et al. | 707/3 |
| 7,155,678 | B2 * | 12/2006 | Cooper et al. | 715/744 |
| 7,275,086 | B1 | 9/2007 | Bodnar | |
| 7,433,876 | B2 * | 10/2008 | Spivack et al. | 707/100 |
| 7,457,814 | B2 * | 11/2008 | Wydroug et al. | 707/101 |
| 2005/0256866 | A1 * | 11/2005 | Lu et al. | 707/5 |
| 2005/0256906 | A1 * | 11/2005 | Bales et al. | 707/104.1 |
| 2006/0004680 | A1 * | 1/2006 | Robarts et al. | 706/12 |
| 2006/0036993 | A1 * | 2/2006 | Buehler et al. | 717/104 |
| 2006/0112146 | A1 * | 5/2006 | Song et al. | 707/200 |
| 2006/0282819 | A1 | 12/2006 | Graham et al. | |
| 2006/0294086 | A1 * | 12/2006 | Rose et al. | 707/3 |
| 2007/0038610 | A1 * | 2/2007 | Omoigui | 707/3 |
| 2007/0113194 | A1 | 5/2007 | Bales et al. | |
| 2007/0156636 | A1 | 7/2007 | Norton et al. | |
| 2007/0204004 | A1 | 8/2007 | Coyer et al. | |
| 2007/0226077 | A1 | 9/2007 | Frank et al. | |
| 2008/0040301 | A1 * | 2/2008 | Sadagopan et al. | 706/16 |
| 2008/0052372 | A1 * | 2/2008 | Weber et al. | 709/217 |
| 2008/0066002 | A1 * | 3/2008 | Nauerz et al. | 715/762 |
| 2008/0086458 | A1 * | 4/2008 | Robinson et al. | 707/3 |
| 2008/0092044 | A1 * | 4/2008 | Lewis et al. | 715/713 |
| 2008/0189265 | A1 * | 8/2008 | Taranov et al. | 707/5 |
| 2008/0195664 | A1 * | 8/2008 | Maharajh et al. | 707/104.1 |

OTHER PUBLICATIONS

Smyth et al, "Relevance at a Distance—An Investigation of Distance-Baised Personalization on the Mobile Internet", 2003, pp. 1-6, http://www.csi.ucd.ie/UserFiles/publications/1125325052899.pdf.*

* cited by examiner

*Primary Examiner*—Adam L Basehoar
(74) *Attorney, Agent, or Firm*—Maxvalueip, LLC

(57) ABSTRACT

This application explores the value of Web 2.0 techniques to perform adaptation based on semantic annotations. Semantic annotations are used to derive user and context models which in turn are used for performing the re-ordering of page layouts or the dynamic transformation of navigation topologies to provide a more user specific portal user interface. The semantic annotations also allow similarities and relationships to be calculated between resources and users so that additional relevant annotations and/or resources can be recommend to the user.

1 Claim, 3 Drawing Sheets

METHOD AND SYSTEM FOR THE UTILIZATION OF COLLABORATIVE AND SOCIAL TAGGING FOR ADAPTATION IN WEB PORTALS

RELATED APPLICATION

This application is related to an application titled "Method and System for Construction of Social Networks and Expert Determination", U.S. Ser. No. 12/027,686, filed on Feb. 7, 2008.

BACKGROUND OF THE INVENTION

Different situations lead to different requirements. Within Web Portal environments the requirements influenced might affect the entire presentation layer, especially with entities such as the navigation or page layout. Currently, the adaptation is based on what central instances like administrators do based on observation of single set of users or user groups. Within the context of Web 2.0 paradigm, contents are now no longer centrally controlled since they comprise of too many pages generated by users and communities that current strategies and algorithms for adaptation neglect. Current models and algorithm for adaptation to different requirements neglect the specificity of each user.

SUMMARY OF THE INVENTION

An embodiment of this invention explores the value of Web 2.0 techniques to further enhance the strategies to perform adaptation, based on semantic annotations.

With semantic annotation, we denote the act of "tagging"—the association of words or phrases with a resource. Tagging functionalities have been built into several web application introduced in recent years (Flickr®, delicious, dogear, citeulike).

An embodiment of the invention uses semantic annotations (i.e. adding semantics to resources) and provides navigation through the semantic space via tag clouds. It performs automatic extraction of data for analysis. Analysis of unstructured data involves a process of deriving high quality information from text. For example, high quality information is derived through the learning of patterns and trends through means such as statistical pattern learning. The embodiment takes advantage of text mining tools which involves the process of structuring the input text (usually parsing, along with the addition of some derived linguistic features and the removal of others, and subsequent insertion into a database), deriving patterns within the structured data, and finally evaluation and interpretation of the output. The quality of text mining depends on some combination of relevance, novelty, and interestingness. Typical text mining tasks include text categorization, text clustering, concept/entity extraction, production of granular taxonomies, sentiment analysis, document summarization, and entity relation modeling (i.e., learning relations between named entities). Accordingly, an embodiment of this invention automatically constructs tags describing the semantics behind objects to perform adaptation, and provides a dynamic navigational topology which based on current context of the user.

DETAILED DESCRIPTION OF THE PREFERRED EMBODIMENTS

Figure 1:
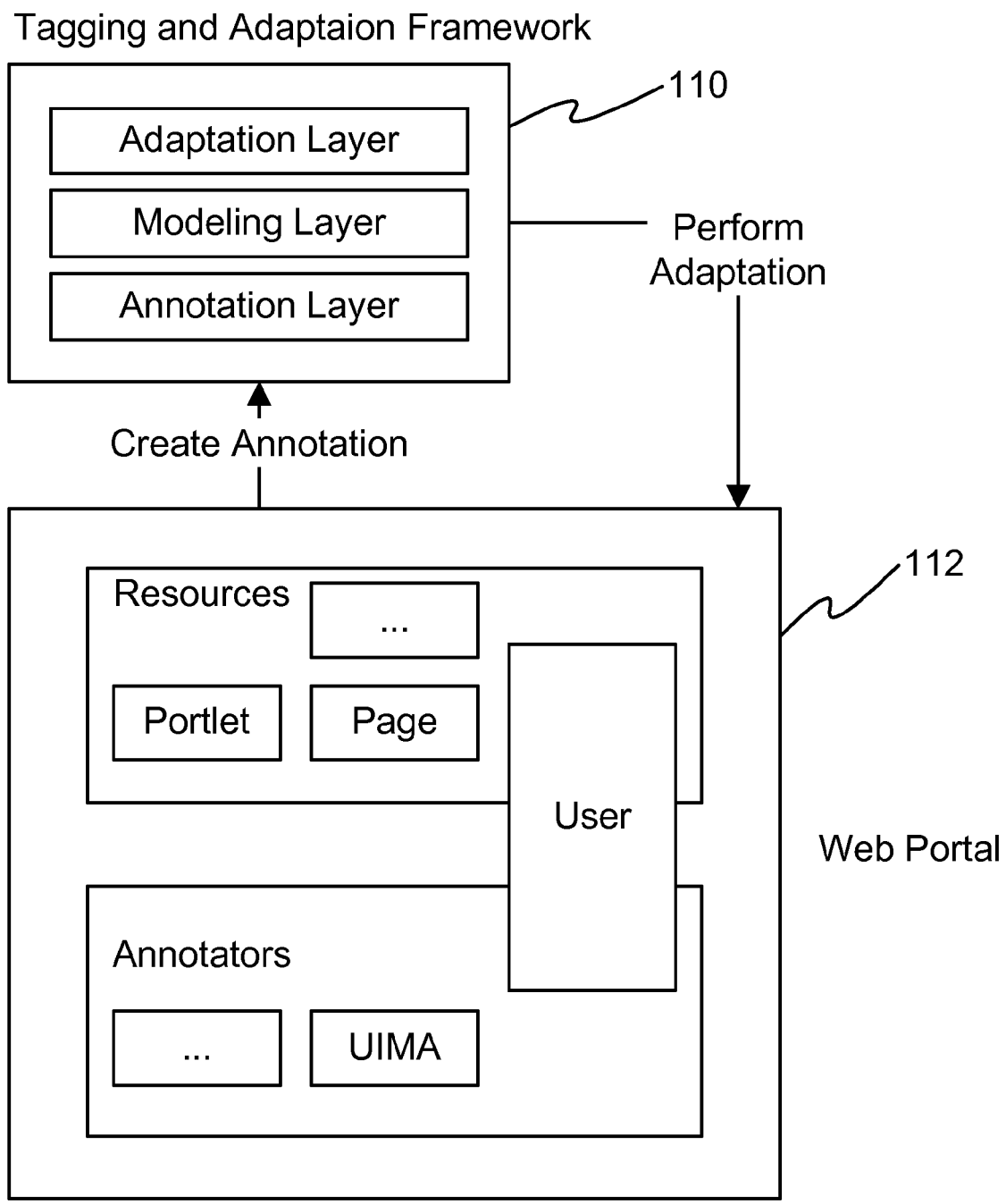
FIG. 1 is a schematic diagram of the tagging and adaptation layer framework
Figure 2:
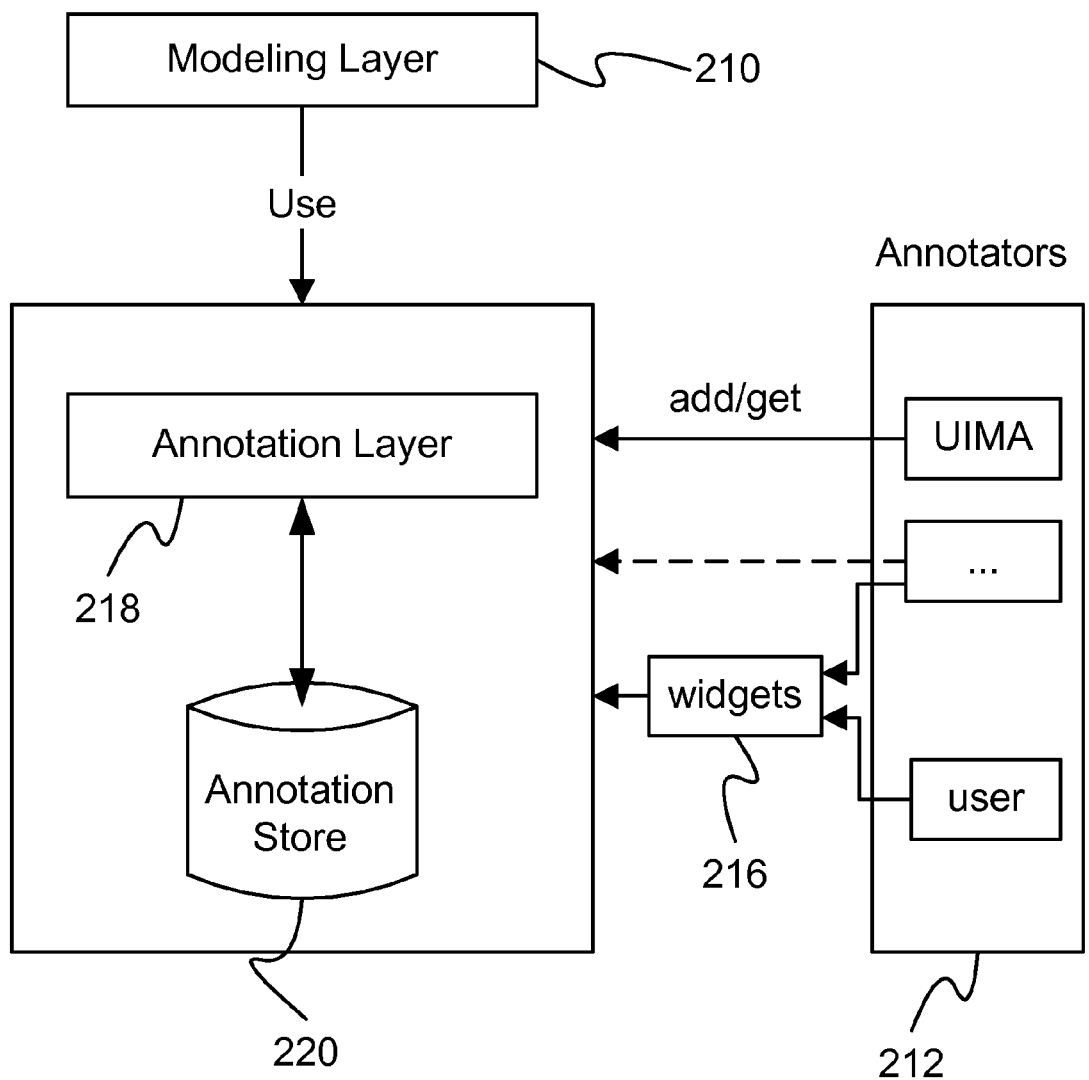
FIG. 2 is a schematic diagram of the modeling and annotation layers

While users are applying annotations we assume they are expressing interest to or knowledge about some topics. Despite some annotations which are only useful to the user herself (e.g. "to read" a private annotation), annotations add some valuable insight into the semantics of the resource and hence into the interests of the user.

The user model in one embodiment is further refined when the annotations applied to this user as a resource. Matching annotations will highly likely indicate an expert in a specific field. By using this kind of annotations a user model is also built for users who do not use the annotation features at all.

In one embodiment, other knowledge about the users' behavior or interests is deduced into (user) group models which subsume the similarities of some users.

In an embodiment, knowing the users' interests or expert knowledge helps generate dynamic buddy lists showing like minded or specialist users related to some resource(s) a user currently works with.

On embodiment assigns the user to a group to recommend the latest changes made by some group members to the others (e.g. a portlet lately annotated as helpful by some users will be recommended to the whole group).

Context Model

One embodiment constructs the context model based on several knowledge sources, e.g., (1) all annotations applied to the resource artifacts a user is currently working with, (2) the creation date and time of resource related annotations, (3) the device a user is working with, (4) the location of the user.

In one embodiment, different context scenarios each form a context profile. E.g., the "traveling" profile may apply to a user using a mobile device while she is not in the office, in contrast to her associate who is present in the office. While in one context profile, a user may uses a very specific vocabulary for annotations and the same may apply to the resources she is working with. As example, a traveling user noticeably often uses resources annotated with "mobile", "schedule", "map", and also, while traveling, she tends to apply these annotations to resources herself.

Semantic-Based Adaptation

One embodiment uses semantic-based adaptation to perform link-level and content-level adaptation. It re-orders the resources which are of interest for the user on the page, or it sorts or hides links to resources to facilitate personalization. By utilizing the derived user and context models different similarity calculations can be performed in an embodiment of the invention.

Examples of methods for determining such similarity values include (1) similarity calculation based on the number of common annotation (and their synonyms) and (2) cosine similarity between two concepts using Latent Semantic Indexing (LSI). The first one will give a higher similarity value if two resources share more annotations or as a variant two annotations will be treated as more similar if they often appear together.

In one embodiment, computing the semantic distance between two resources annotated by a user (e.g. based on the number of common annotation) or between the annotations of the resources themselves will provide a value indicating the relatedness of these resources.

One embodiment performs re-ordering of the pages layout or transformation of the navigation topology and provides a more user specific portal UI. For example, based on the users' interests the more important portlets on a page are grouped at the beginning; or while performing a specific task, portlets marked as helpful are shown dynamically and unnecessary content vanishes. One embodiment moves or hides navigation tree nodes depending of their relevance.

Performing the semantic distance calculation on a resource and a user in one embodiment shows of how much interest the resource is for this user. When using this metric to compare two users, it indicates how related their interests are. To utilize the results of these comparisons, an embodiment provides recommendation (330) to advice other resources (e.g. pages, portlets, expert users) which are highly likely of interest in the current context.

One embodiment performs adaptation in the user group analysis. If a specific fraction of group members lately applied the same annotation(s) to a new resource, the embodiment recommends this resource to the other users, as well.

Figure 3:
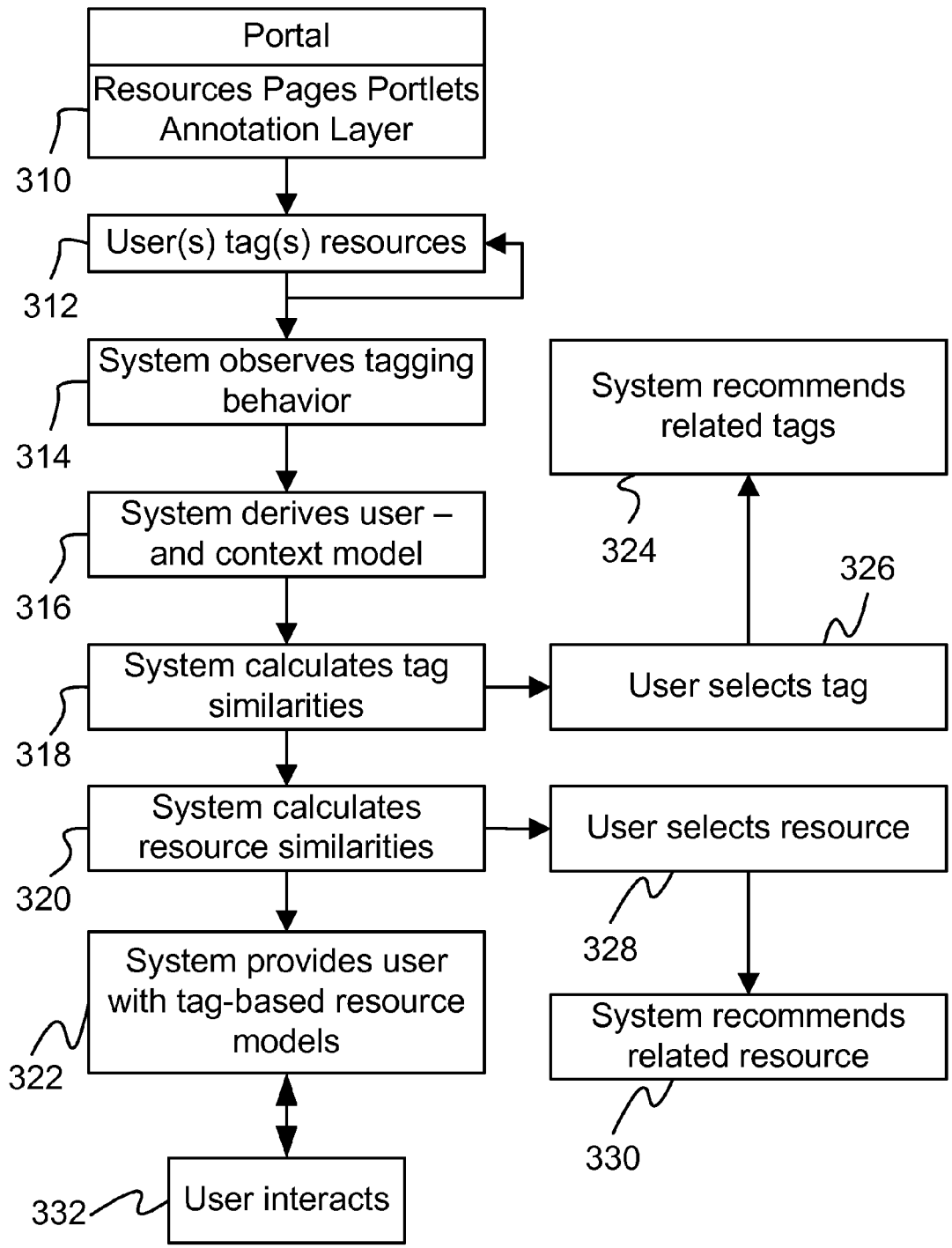
FIG. 3 is the flow diagram of tagging and annotation

In one embodiment, an architecture allows any kind of annotator be it a human user or a programmatic one to annotate any resource within web portals (FIG. 3). The data will then be used by modeling and adaptation components that facilitate different adaptation methods. One embodiment provides tailor-made navigation structures and page layout as well as recommendations (330) and suggestions for each individual user to interact with (332) based on automatically generated semantic annotations (322).

One embodiment provides a generic annotation store (220) which can be accessed by different kinds of annotators (212) via an annotation layer (218). This will enable user generated annotations to be stored along with automatically extracted semantics, e.g. by specialized annotators running in a framework like Unstructured Information Management Architecture (UIMA). Tagging and adaptation framework (110) for a web portal (112) comprises an adoption layer (used to generate navigation topology for a given user in a given context within the web portal), modeling layer (which manages both user model and context model) (210), and annotation layer (which provides an interface to annotators (including users) to tag resources of the portal and support creation and management of tags).

One embodiment of the invention is a method of providing a navigation topology in a portal (112 or 310) supporting a social network, the method comprising:

annotating portal resources; wherein the portal resources are uniquely identifiable fragments; wherein the portal resources comprise one or more of the following: page, portlet (216), user, email, wiki, blog post, or applet (310); wherein the annotation is performed by a user (312), or is performed automatically by extracting some data from first portal resources among the portal resources visited by the user;

an automated bot annotating the portal resources;

tracking the user's annotating behavior (314), based on all annotations applied to the portal resources which the user visits or uses;

deriving a user model (210 or 316) based on all users' annotating behavior, preference and interest, and profiles, using a web mining method;

deriving a context model (316) based on one or more of factors; wherein the one or more of factors comprise of the user's annotating behavior, timing of resource annotations, a device the user is working with, and a location of the user;

determining similarities and relationships between the portal resources (320) and tags (318), by calculating a semantic distance between the tags and the portal resources;

partitioning the user model into a sole partition for each context profile available in the context model;

automatically determining a matching profile, by observing a set of predefined context attributes; wherein the user has an option to override the matching profile;

when users select tags (326) and resources (328), recommending related tags (324) and related resources (330).

dynamically adopting a navigation topology for each of the all users, by generating a tree model at run time, based on behavior of the each of the all users and current context. The method uses a tag-driven structure (322) with a minimum click distance between content elements that are annotated. The navigation topology comprises of a dynamic node; and the dynamic node is associated with a transformation. To dynamically adopt the navigation topology, the method constructs topology by traversing the tree model, and invoking the transformation. The transformation performs its specific operation to generate a sub-model; and the sub-model is phased into the navigation topology, directly underneath the dynamic node.

A system, apparatus, or device comprising one of the following items is an example of the invention: navigation topology, portal, social network, portal resources, annotation, page, portlet, user, email, wiki, blog post, applet, automated bot, user model, user preference and interest, user profile, web mining tool, context model, tag, semantic distance, tree model, click distance, node, dynamic node, sub-model, or any software, applying the method mentioned above, for purpose of invitation or providing a navigation topology in a portal supporting a social network.

Any variations of the above teaching are also intended to be covered by this patent application.

The invention claimed is:

1. A computer implemented method of providing a navigation topology in a portal supporting a social network, said method comprising:

annotating portal resources;

wherein said portal resources are uniquely identifiable fragments;

wherein said portal resources comprise one or more of the following: page, portlet, user, email, wiki, blog post, or applet;

wherein said annotation is performed by a user, or is performed automatically by extracting some data from first portal resources among said portal resources visited by said user;

an automated bot annotating said portal resources;

storing said user generated annotations and said bot generated annotations in an annotation store accessible by a plurality of different annotators;

tracking said user's annotating behavior, based on all annotations applied to said portal resources which said user visits or uses;

deriving a user model based on all users' annotating behavior, said all users' preference and interest, and said all users' profiles, using a web mining method;

wherein said web mining method comprises at least text mining;

assigning said user to a group model based on said web mining method and recommending changes made by a specific fraction of other group members of said group model to said user;

deriving a context model based on one or more of factors;

wherein said one or more of factors comprise one of said user's annotating behavior, timing of resource annotations, a device said user is working with, and a location of said user;

determining similarities and relationships between said portal resources and tags, by calculating a semantic distance between said tags and said portal resources;

partitioning said user model into a sole partition for each context profile available in said context model;

automatically determining a matching profile, by observing a set of predefined context attributes;

wherein said user has an option to override said matching profile;

dynamically adopting a navigation topology for each of said all users, by generating a tree model at run time, based on behavior of said each of said all users and current context;

wherein a tag-driven structure has a minimum click distance between content elements that are annotated;

wherein said navigation topology comprises a dynamic node;

wherein said dynamic node is associated with a transformation;

wherein said dynamically adopting said navigation topology comprises constructing a topology by traversing said tree model, and invoking said transformation;

wherein said transformation performs its specific operation to generate a sub-model;

wherein said specific operation comprises one of moving or hiding navigation tree nodes depending on their relevance;

wherein said sub-model is phased into said navigation topology, directly underneath said dynamic node; and displaying said constructed topology to said user.

* * * * *